(12) United States Patent
Song et al.

(10) Patent No.: US 11,156,780 B2
(45) Date of Patent: Oct. 26, 2021

(54) OPTICAL SYSTEM

(71) Applicant: miDiagnostics NV, Leuven (BE)

(72) Inventors: Jeonghwan Song, Leuven (BE); Roelof Jansen, Leuven (BE); Xavier Rottenberg, Leuven (BE); Gil Linenberg, Leuven (BE); Kirill Zinoviev, Leuven (BE)

(73) Assignee: miDiagnostics NV, Leuven (BE)

( * ) Notice: Subject to any disclaimer, the term of this patent is extended or adjusted under 35 U.S.C. 154(b) by 0 days.

(21) Appl. No.: 16/013,062

(22) Filed: Jun. 20, 2018

(65) Prior Publication Data

US 2018/0364417 A1    Dec. 20, 2018

(30) Foreign Application Priority Data

Jun. 20, 2017   (EP) .................................... 17176770

(51) Int. Cl.
*G02B 6/26* (2006.01)
*G02B 6/42* (2006.01)
*G02B 6/12* (2006.01)

(52) U.S. Cl.
CPC ........... *G02B 6/26* (2013.01); *G02B 6/12004* (2013.01); *G02B 6/42* (2013.01); *G02B 6/4214* (2013.01); *G02B 2006/12147* (2013.01)

(58) Field of Classification Search
None
See application file for complete search history.

(56) References Cited

U.S. PATENT DOCUMENTS

| | | | |
|---|---|---|---|
| 7,298,941 B2 * | 11/2007 | Palen | G02B 6/4206 264/1.1 |
| 10,481,348 B2 * | 11/2019 | Song | G02B 6/4206 |
| 2006/0239605 A1 | 10/2006 | Palen et al. | |
| 2015/0125110 A1 * | 5/2015 | Anderson | G02B 6/122 385/14 |
| 2016/0018610 A1 | 1/2016 | Krishnamurthi et al. | |
| 2017/0205583 A1 * | 7/2017 | Bennett | G02B 6/02033 |

OTHER PUBLICATIONS

EPO, Office Action for EP Application No. 18178906, dated Oct. 26, 2018.

* cited by examiner

*Primary Examiner* — Chad H Smith
(74) *Attorney, Agent, or Firm* — Hodgson Russ LLP

(57) ABSTRACT

There is provided an optical system comprising a photonic integrated circuit which is integrated on a platform and an element having a first surface being attached to the platform. The element has a groove in the first surface, and the groove is filled with a medium having a refractive index which is different from that of the element. The groove has a surface with a normal that forms an angle with respect to a predetermined light direction, thereby allowing changing a direction of light which is incident on the platform along the predetermined light direction. The element and the medium filling the groove are transparent for a wavelength range of the light which is incident on the platform.

14 Claims, 4 Drawing Sheets

OPTICAL SYSTEM

CROSS-REFERENCE TO RELATED APPLICATIONS

This application claims priority to European Application No. EP17176770 filed Jun. 20, 2017, titled "OPTICAL SYSTEM", the entire disclosure of which is incorporated herein by reference.

TECHNICAL FIELD

The disclosed embodiments relate to an optical system.

BACKGROUND

Silicon photonics has emerged as a mature technology platform for applications in optical data communications and telecommunications. High quality photonic integrated circuits (PICs) can today be fabricated with good process control and yield. The small dimensions of PICs introduce a challenge for engineers designing the optical components for these systems.

One group of optical components is the optical path changing elements which are arranged for changing the direction of light incident on the element. The optical path changing elements are used, for example, for coupling light from a laser or other external light source into an optical system such as a high index contrast waveguide platform. Optical path changing elements are available in many forms and perform somewhat different tasks. A relatively simple optical path changing element is a mirror. Other optical path changing elements may, in addition to changing a general direction of light often defined using the concept of an optical axis, also refract the light such as to focus or diverge the light. Optical path changing elements may also be used for dispersing light.

There are several types of optical path changing elements in the art. One such example is conventional micro-turning mirrors (e.g. prisms). These components are, however, bulky and expensive. Therefore, they are hard to be employed on a compact planar integrated circuit (PIC) module. A typical size of conventional turning mirrors is a few millimeters. However, often only tens of microns are available on the top surface area of PIC modules. Another type of optical path changing structure is the monolithic turning mirror. However, the angle and height of the mirror will be limited by fabrication conditions. There is thus room for improvements.

SUMMARY

An optical system includes a photonic integrated circuit which is integrated on a platform, and an element having a first surface which is attached to the platform. The element has a groove in the first surface, the groove being filled with a medium having a refractive index which is different from that of the element, and the groove having a surface with a normal that forms an angle with respect to a predetermined direction of the incident light, thus allowing changing a direction of light which is incident on the platform along the predetermined direction. The element and the medium filling the groove are transparent for a wavelength range of the light which is incident on the platform.

BRIEF DESCRIPTIONS OF THE DRAWINGS

The above, as well as additional features and advantages, will be better understood through the following illustrative and non-limiting detailed description of several embodiments described herein, with reference to the appended drawings, where the same reference numerals will be used for similar elements, wherein:

FIG. 1b shows a perspective view of the element 106 of the optical system 100 shown in FIG. 1a.

FIG. 1c shows a side view of the element 106 of the optical system 100 shown in FIG. 1a.

DETAILED DESCRIPTION

Figure 1A:
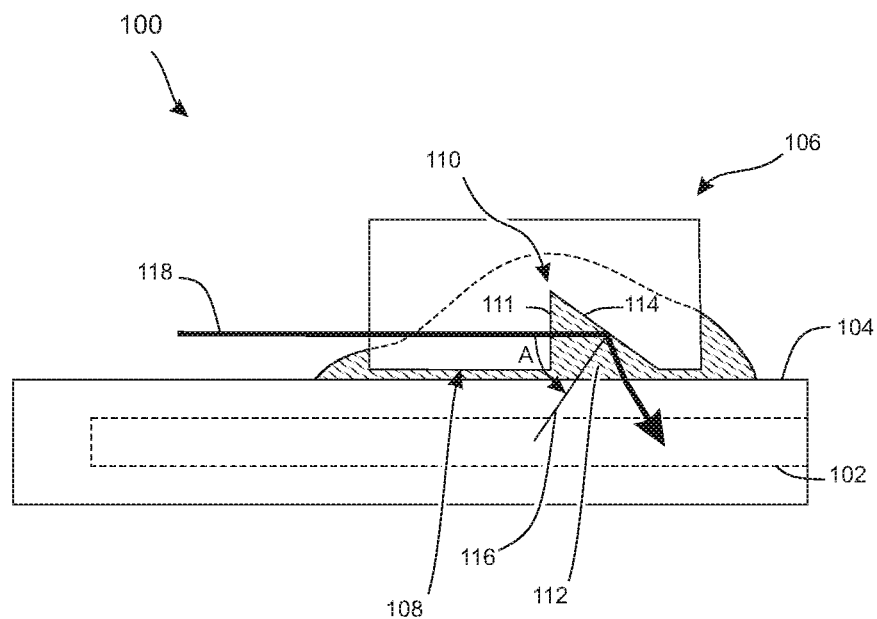
FIG. 1a shows schematically a side view of an optical system 100 according to example embodiments of the present disclosure.

It is an object to provide optical path changing elements which are small enough for use on a PIC and which may be manufactured at a reduced cost as compared to the solutions known in the art.

According to a first aspect, example embodiments provide an optical system that includes a photonic integrated circuit which is integrated on a platform, and an element having a first surface which is attached to the platform. The element has a groove in the first surface, the groove being filled with a medium having a refractive index which is different from that of the element, and the groove having a surface with a normal that forms an angle with respect to a predetermined direction of the incident light, thus allowing changing a direction of light which is incident on the platform along the predetermined direction. The element and the medium filling the groove are transparent for a wavelength range of the light which is incident on the platform.

The optical system achieves a change in the direction of light by providing microscale optical components formed in a surface of the significantly larger element that is attached onto the platform. The optical system has several advantages over the solutions of the art. It provides a significantly less expensive and bulky solution as compared to using discrete optical elements such as mirror and prisms. Monolithically fabricated optical components are available by etching techniques, but have disadvantages due to challenges associated with its fabrication. For example, fabrication may be limited to specific angles and/or dimensions of the optical components. For example, to fabricate a surface angled ~60 degree or smaller in relation to a surface plane of the PIC, a special etching technique is required such as using a grey scale mask, an etching technique which is expensive. Often, it is challenging, and sometimes not even possible, to fabricate tilting surfaces using conventional etching techniques without using specials tools or methodologies. Thus, under realistic circumstances, the degrees of freedom when tailoring an optical system using etching techniques will often be limited.

According to some embodiments, the normal forms an angle with respect to the predetermined direction of the incident light which is equal to or larger than a critical angle for total internal reflection. This is advantageous as it allows for changing the direction of light by internal reflection on one of the surfaces of the groove. Thus, the light may be arranged to enter the photonic integrated circuit of the platform directly after having left the medium within the groove.

According to some embodiments, the groove has the shape of a polygon prism with triangular or quadrangular base. Using flat surfaces is advantageous for applications where changes are only required on a general direction of light without introducing beam shaping. One example of such an application is coupling laser light into a waveguide.

According to some embodiments, the groove has the shape of a half-cylinder. Using curved surfaces may be an advantage for some embodiments as it allows for, in addition to changing the general direction of light, also change the beam shape. Accordingly, the incoming light may be focused and/or unfocused in the curved surfaces. Thus, light incoming to the groove at a divergence may be adjusted such as to decrease its divergence.

According to some embodiments, a surface of the groove has a coating. This may be advantageous as the coating allows tailoring the optical system even further, for example by increasing the range of angles for which the groove may cause internal reflection. Also, a coating may serve to make the surface smoother, thereby compensating for manufacturing imperfections in the surface.

According to some embodiments, the medium which fills the groove has a refractive index which is higher than that of the element.

According to some embodiments, the medium which fills the groove has a refractive index which is lower than that of the element.

According to some embodiments, the medium which fills the groove is adhesive, wherein the first surface of the element is attached to the platform by said medium. The medium which fills the groove may further be used to attach the element to the platform.

According to some embodiments, the medium which fills the groove is an epoxy.

According to some embodiments, the element has a plurality of grooves arranged in parallel in the first surface. Thus, the light may successively be refracted by the plurality of grooves so as to shape the light path of the incoming light.

According to some embodiments, at least two of the plurality of grooves have different shapes. This may be advantageous as it allows light to interact with a plurality of surfaces, thus allowing for an increased degree of freedom of the optical system, i.e., thereby allowing designing a desired light path of the incoming light.

According to some embodiments, at least two of the plurality of grooves have different depths.

According to some embodiments, the groove extends along a direction of the first surface which is perpendicular to the direction of the incident light.

According to a second aspect there is provided a diagnostic device comprising the optical system of the first aspect.

The second aspect may generally have the same features and advantages as the first aspect. It is further noted that the concepts disclosed herein relate to all possible combinations of features unless explicitly stated otherwise.

The term "predetermined light direction" as used herein should be understood as a reference direction for light incident on the optical system. The optical system may hence be designed with respect to a particular, predetermined light direction. For an ideal collimated light beam, light will follow the predetermined light direction. For a convergent or divergent light beam the predetermined light direction should be interpreted as at least one of the directions of the light in the convergent or divergent light beam. The light incident on the optical system may have a circular cross section, but may alternatively have an asymmetric profile, such as an elliptical profile. The cross section may depend on the light source and/or the optical waveguide of the light source. The light incident on the optical system may be a light sheet. This implies that the light may have a rectangular or near rectangular cross section.

As disclosed herein, a material is defined as "optically transparent" for a specific wavelength range if it allows light in that wavelength range to pass through the material without being scattered. This implies that, on a macroscopic scale (one where the dimensions investigated are much, much larger than the wavelength of the light in question), the light follows Snell's Law during its passage of the optically transparent material. In some embodiments, the optically transparent material allows more than 85% of the incident light to be transmitted through one meter of the material. Example optically transparent materials include silicon, silica, silicon nitride, silicon oxynitride, aluminium oxide, titanium oxide etc. Such materials have a propagation loss in the order of 1-2 dB/cm.

Various embodiments will now be described more fully hereinafter with reference to the accompanying drawings. The concepts disclosed herein may, however, be embodied in many different forms and should not be construed as limited to the embodiments set forth herein; rather, these embodiments are provided for thoroughness and completeness, and to fully convey the scope of the concepts disclosed herein to the skilled person.

FIG. 1a shows an optical system 100 according to an example embodiment. The optical system 100 is arranged to couple light of a specific wavelength range incident on the platform into a photonic integrated circuit 102 integrated on a platform 104 of the optical system 100. The photonic integrated circuit 102 may comprise further beam shaping components to redirect the light incident on the photonic integrated circuit 102. Such beam shaping components may be, for example, a grating coupler. The platform 104 is made for example from indium phosphide.

Figures 1B, 1C:
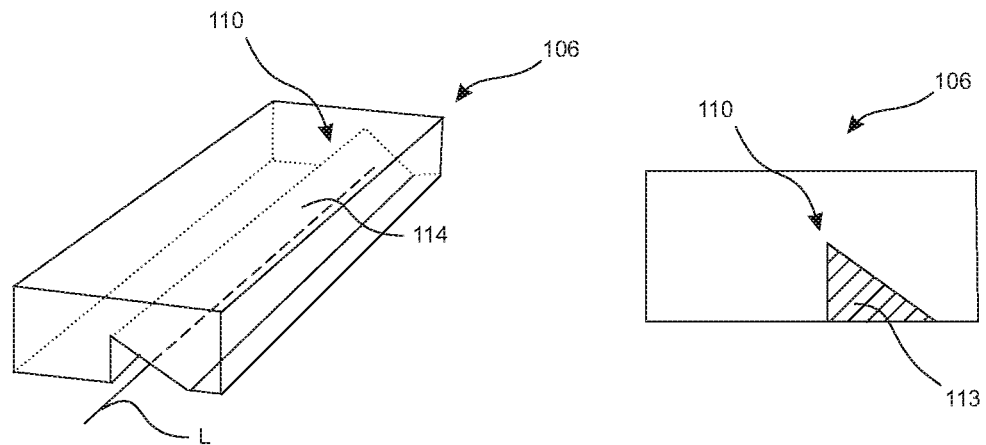

The optical system 100 further comprises an element 106 which is attached to the platform 104. The element 106 is further illustrated in FIGS. 1b and 1c. The element 106 is made from a material which is optically transparent for the specific wavelength range of incident light. For the example optical system 100, the element 106 comprises glass with a refractive index of $n_e$=1.45. The element 106 may comprise other types of glass having different refractive index. The element 106 may comprise other material than glass, such as for example quartz or a polymeric material. The element 106 may have a refractive index within the interval $1.2<n_e<1.5$. The element 106 has a first surface 108 and a groove 110 in said first surface 108. The groove 110 has a cross section 113 as seen along a longitudinal extension L of the groove, in the micrometre scale (See FIG. 1c). For example, the groove in FIG. 1a may have a width of 75 μm along the direction of incident light 118. Alternatively, the groove in FIG. 1a may have a width within the range 40-100 µm. The groove 110 may be obtained by using dicing techniques in which the groove 110 is created in a substrate such as a glass wafer by means of dicing blades. Various types of dicing blades are commercially available for fabricating grooves. The groove angles and hence its cross section may be defined by the angle of the dicing blades.

The groove 110 is filled with a medium 112 which is optically transparent for the wavelength range of the light which is incident on the platform 104. The medium 112 has a refractive index which is different from that of the element 106. For the example optical system 100, the medium 112 which fills the groove 110 has a refractive index which is higher than that of the element 100. Apart from fulfilling the specific optical characteristics needed for the medium 112 within the groove 110, the medium 112 may serve the additional purpose of fixating the element 106 to the platform 104.

For example, the medium 112 which fills the groove 110 may be adhesive. This allows for the first surface 108 of the element 106 to be attached to the platform 104 by the medium 112. Specifically, for the example optical system 100, the medium 112 is an optically transparent epoxy having a refractive index $n_e$=1.55. Alternative epoxy materials may have other refractive indices. In some embodiments, non-epoxy materials may be used. The medium 112 may have a refractive index within the interval $1.3 < n_e < 1.6$.

The groove 110 may have the shape of a polygon prism with triangular or quadrangular base. Thus, the groove 110 may have the shape of a triangular prism. This may be beneficial from a manufacturing point of view as it is easily implementable using a dicing technique. Alternatively, the groove 110 may have the shape of a triangular pyramid, square pyramid, etc. For the optical system 100, the groove has the shape of a polygon prism with a base of a right-angled triangle. The groove 110 extends along a direction of the first surface 108 which is perpendicular to the direction of the incident light 118. Moreover, the element is arranged such that the entrance surface 111 of the polygon prism that corresponds to the short side of its right-angled triangular base is facing the incident light. Moreover, in the illustrated embodiment, the predetermined direction 118 of the light incident on the platform 104 is parallel with the normal of the entrance surface 111, thus allowing the light to pass through the entrance surface 111 without changing its direction.

The groove 110 has a surface 114 with a normal 116 that forms an angle A with respect to a predetermined direction 118 of light which is incident on the platform 104. The light, which travels along the predetermined direction 118, hits the surface 114 on the other side of the groove 110. Due to the surface 114 being tilted such that its normal 116 forms an angle A with respect to the predetermined direction 118 of the light which is incident on the platform 104, the light will change its direction. This thus allows for changing a direction of the light from the predetermined direction 118 to another direction different than the predetermined direction 118.

The change of direction of the light may be obtained by different mechanisms such as reflection, refraction, diffraction etc. For the optical system 100 in FIG. 1, the mechanism is internal reflection on the surface 114. In other words, the normal 116 forms an angle A with respect to the predetermined direction 118 of the incident light which is equal to or larger than a critical angle for total internal reflection. For the optical system 100, the angle A will be near 20 degrees. The angle A may be within the range 20 to 40 degrees for total internal reflection to occur.

The optical properties of the surfaces of the groove 110 (such as the entrance surface 111 and/or the surface 114) may be tailored by coating one or more from the surfaces with a material adapted to change the optical properties of the surface. The coating may also compensate for manufacturing imperfections, such as roughness, of the surface 111 or 114.

Figure 2:
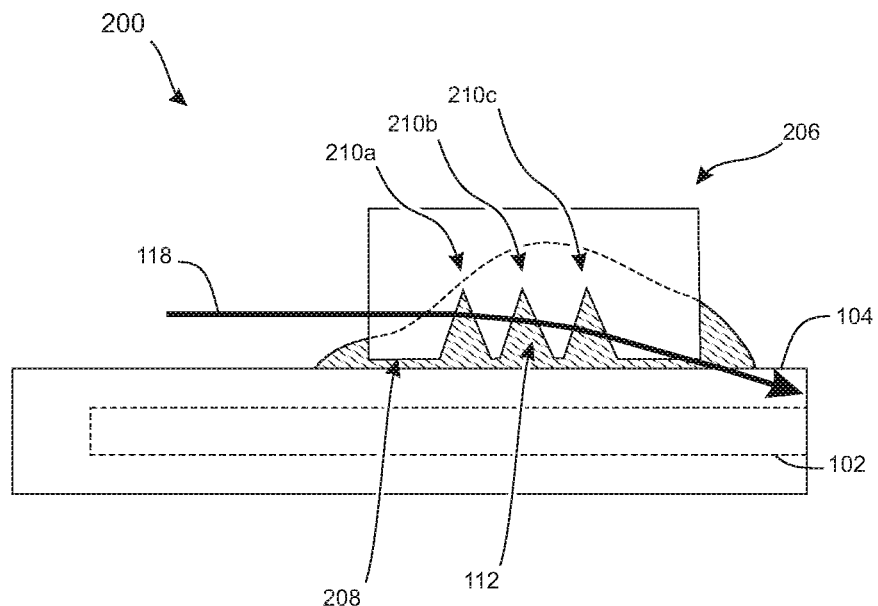
FIG. 2 shows schematically a side view of an optical system 200 according to example embodiments of the present disclosure.

FIG. 2 shows an optical system 200 wherein the element 206 has a plurality of grooves 210a, 210b, 210c (in the example: three grooves) arranged in parallel in the first surface 208. By combining more than one groove, it is possible to increase the degrees of freedom when tailoring the optical system for a specific application. For example, the light may be tailored to follow a predetermined path as it passes through the element 206.

Figure 3:
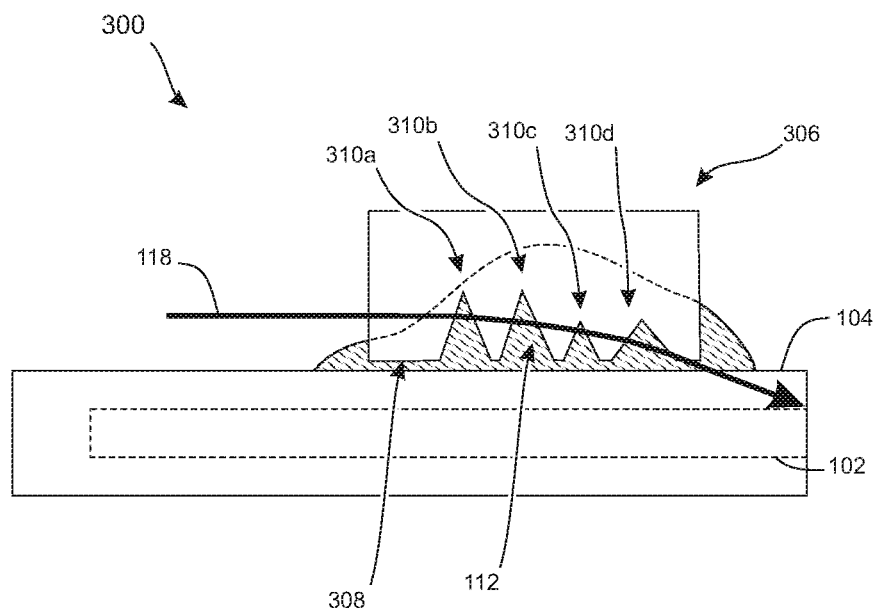
FIG. 3 shows schematically a side view of an optical system 300 according to example embodiments of the present disclosure.

FIG. 3 shows an optical system 300 wherein the element 306 has a plurality of grooves 310a, 310b, 310c, 310d (in the example: four grooves) arranged in parallel in the first surface 308. A difference between the optical system 300 and the optical system 200 is that the grooves are allowed to have different shapes. Thus, at least two of the plurality of grooves 310a, 310b, 310c, 310d have different shapes. Moreover, at least two of the plurality of grooves 310a, 310b, 310c, 310d have different depths. By combining more than one groove and allowing the groove shape to differ, it is possible to further increase the degrees of freedom when tailoring the optical system for a specific application. It is further possible to allow the grooves 210a, 210b, 210c to be filled with a different material.

Figure 4:
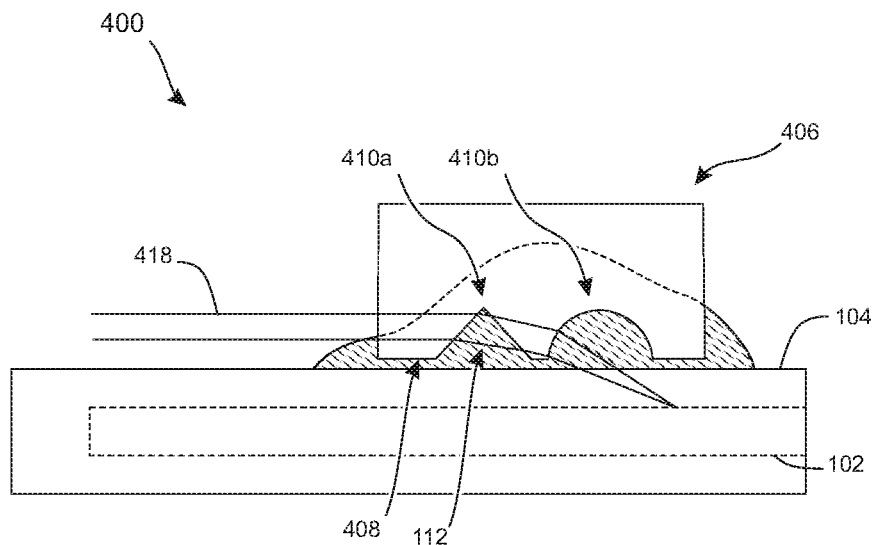
FIG. 4 shows schematically a side view of an optical system 400 according to example embodiments of the present disclosure.

FIG. 4 shows an optical system 400 wherein the element 406 has a first groove 410a having planar surfaces and a second groove 410b having a curved surface. Specifically, the cross-section of the second groove 410b taken perpendicularly to the longitudinal extension of the second groove 410b has the shape of a half cylinder. This may allow focusing of a light beam incident on the groove in at least one dimension. This is illustrated in FIG. 4 using the dual lines 418 marking a border region of the incident light beam, which border region is seen refracted to a different degree in the curved surface of the second groove 410b. The curved surface of the second groove 410b has, at the point where the light hits the curved surface, a normal which forms an angle with respect to the direction of the light as it hits the curved surface.

For the optical systems 100, 200, 300 and 400 the predetermined light direction is parallel with the first surface. This implies that light enters the element from the side. These geometries may be an advantage when coupling laser light from a solid-state laser and/or via an optical fibre into the photonic integrated circuit. Other geometries may allow light to enter the element via a top surface of the element as will be further disclosed below.

Figure 5:
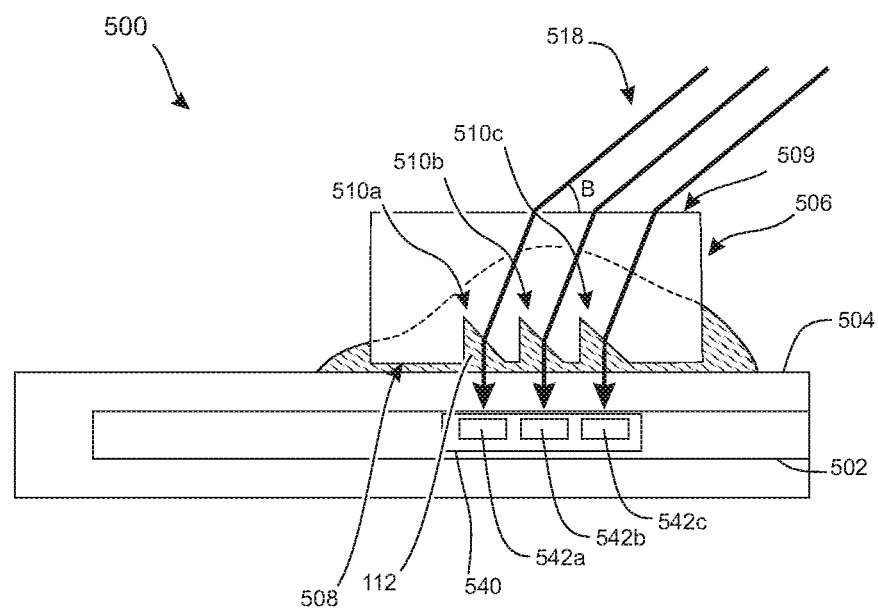
FIG. 5 shows schematically a side view of an optical system 500 according to example embodiments of the present disclosure.

FIG. 5 shows an optical system 500 wherein the element 506 has a plurality of grooves 510a, 510b, 510c (in the example: three grooves) arranged in parallel in the first surface 508. Light is incident on the platform along a predetermined light direction 518 forming an oblique angle B with a top surface 509, being parallel to the first surface 508, of the element 506. The light that enters the element 506 through the top surface 509 is refracted in the transition and propagates through the element towards the plurality of grooves 510a, 510b, 510c. The light is further refracted in the transition between the element 506 and the medium 312 within the plurality of grooves 510a, 510b, 510c. The optical system 500 further comprises a sensor device 540 arranged in the photonic circuit 502. The sensor device 540 comprises a plurality of light-sensitive elements 542a, 542b, 542c. Specifically, for the optical system 500, each groove among the plurality of grooves have a corresponding light-sensitive element among the plurality of light-sensitive elements 542a, 542b, 542c.

The sensor device may be an imaging device. For example, the sensor device may be a charged coupled device (CCD). Alternatively, the sensor device may be a complementary metal-oxide-semiconductor (CMOS) sensor. The sensor device may be an imaging sensor device. This implies that the sensor device may have a plurality of light-sensitive elements arranged within a plane forming rows and columns as a matrix. The plurality of grooves may be arranged in parallel rows such that each groove refracts light onto a specific row of light-sensitive elements of the sensor unit. Alternatively, the sensor device may have a plurality of light-sensitive elements arranged in a row, i.e. the sensor device may be a row sensor.

Figure 6:
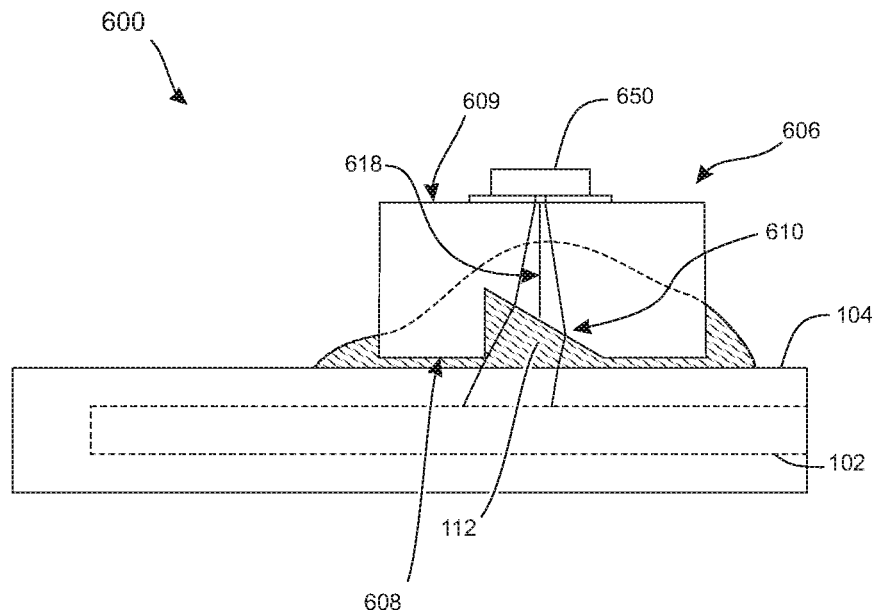
FIG. 6 shows schematically a side view of an optical system 600 according to example embodiments of the present disclosure.

FIG. 6 shows an optical system 600 wherein the element 606 has one groove 610 arranged in the first surface 608. The optical system 600 further comprises a vertical-cavity surface-emitting semiconductor laser diode (VCSEL) 650 attached on the top surface 609 of the element 606. The VCSEL 650 emits a divergent laser beam 618 directed towards the groove 610. The laser beam 618 is refracted in the transition between the element and the medium 112 within the groove.

Figure 7:
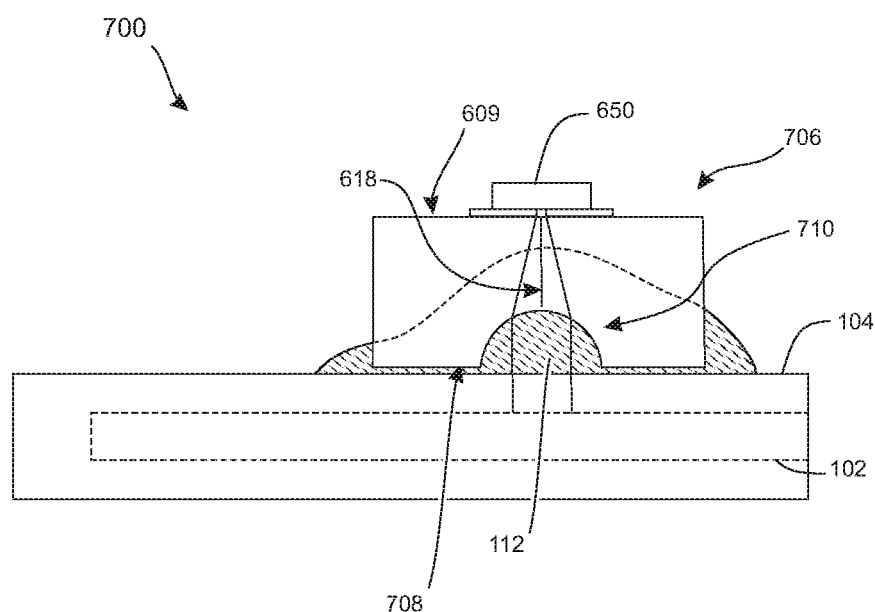
FIG. 7 shows schematically a side view of an optical system 700 according to example embodiments of the present disclosure.

FIG. 7 shows an optical system 700 which is similar to the optical system 600. However, the element 706 of the optical system 700 comprises a groove 710 with a curved surface. Specifically, the cross-section of the groove taken perpendicularly to the longitudinal extension of the groove has the shape of a half cylinder. This may allow focusing of the divergent light beam incident on the groove 710, in at least one dimension. The divergent light beam hits the surface of the groove 710 at different directions. At least for some of these directions, the surface of the groove, at a point where the light hits the surface, has a normal forming an angle with respect to the incoming light direction, thereby serving to redirect the light. The surface of the groove 710 may be curved also in the dimension along the extension of the groove. This may allow for collimating a light beam in more than one dimension.

The embodiments herein are not limited to the above described examples. Various alternatives, modifications and equivalents may be used. Therefore, this disclosure should not be limited to the specific form set forth herein. This disclosure is limited only by the appended claims and other embodiments than the mentioned above are equally possible within the scope of the claims.

The invention claimed is:

1. An optical system, comprising:
   a photonic integrated circuit which is integrated on a platform; and
   an element having a first surface, the first surface being attached to the platform,
   wherein the element has a groove in the first surface, the groove being filled with a medium having a refractive index which is different from that of the element, and the groove having a surface with a normal that forms an angle with respect to a predetermined light direction to cause a change in a direction of light which is incident on the platform along the predetermined light direction, the groove having a longitudinal dimension arranged in a direction different from the predetermined light direction,
   wherein the element and the medium filling the groove are transparent for a wavelength range of the light which is incident on the platform; and
   wherein the groove has the shape of a polygon prism with triangular or quadrangular base.

2. The optical system of claim 1, wherein the normal forms an angle with respect to the predetermined light direction which is equal to or larger than a critical angle for total internal reflection.

3. The optical system of claim 1, wherein the groove has the shape of a half-cylinder.

4. The optical system of claim 1, wherein a surface of the groove has a coating.

5. The optical system of claim 1, wherein the medium that fills the groove has a refractive index which is higher than that of the element.

6. The optical system of claim 1, wherein the medium that fills the groove has a refractive index which is lower than that of the element.

7. The optical system of claim 1, wherein the medium that fills the groove is adhesive, wherein the first surface of the element is attached to the platform by said medium.

8. The optical system of claim 1, wherein the medium that fills the groove is an epoxy.

9. The optical system of claim 1, wherein the element has a plurality of grooves arranged in parallel in the first surface.

10. The optical system of claim 9, wherein at least two of the plurality of grooves have different shapes.

11. The optical system of claim 9, wherein at least two of the plurality of grooves have different depths.

12. The optical system of claim 1, wherein the groove extends along a direction of the first surface which is perpendicular to the predetermined light direction.

13. An optical system, comprising:
    a photonic integrated circuit which is integrated on a platform; and
    an element having a first surface, the first surface being attached to the platform,
    wherein the element has a groove in the first surface, the groove being filled with a medium having a refractive index which is different from that of the element, and the groove having a surface with a normal that forms an angle with respect to a predetermined light direction, allowing changing a direction of light which is incident on the platform along the predetermined light direction,
    wherein the element and the medium filling the groove are transparent for a wavelength range of the light which is incident on the platform,
    wherein the normal forms an angle with respect to the predetermined light direction which is equal to or larger than a critical angle for total internal reflection.

14. An optical system, comprising:
    a photonic integrated circuit which is integrated on a platform; and
    an element having a first surface, the first surface being attached to the platform,
    wherein the element has a groove in the first surface, the groove being filled with a medium having a refractive index which is different from that of the element, and the groove having a surface with a normal that forms an angle with respect to a predetermined light direction to cause a change in a direction of light which is incident on the platform along the predetermined light direction, the groove having a longitudinal dimension arranged in a direction different from the predetermined light direction, wherein the element and the medium filling the groove are transparent for a wavelength range of the light which is incident on the platform; and wherein the medium that fills the groove has a refractive index which is higher than that of the element.

* * * * *